(12) United States Patent
Devos

(10) Patent No.: US 11,948,548 B2
(45) Date of Patent: Apr. 2, 2024

(54) PHONON PARAMETRIC OSCILLATOR

(71) Applicants: CENTRE NATIONAL DE LA RECHERCHE SCIENTIFIQUE, Paris (FR); UNIVERSITE DE LILLE, Lille (FR); YNCREA HAUTS DE FRANCE ISEN LILLE, Lille (FR)

(72) Inventor: Arnaud Devos, Ennetieres en Weppes (FR)

(73) Assignees: CENTRE NATIONAL DE LA RECHERCHE SCIENTIFIQUE, Paris (FR); JUNIA, Lille (FR); UNIVERSITE DE LILLE, Lille (FR); CENTRALE LILLE INSTITUT, Villeneuve-d'Ascq (FR)

( * ) Notice: Subject to any disclaimer, the term of this patent is extended or adjusted under 35 U.S.C. 154(b) by 832 days.

(21) Appl. No.: 16/969,054

(22) PCT Filed: Feb. 8, 2019

(86) PCT No.: PCT/EP2019/053094
§ 371 (c)(1),
(2) Date: Aug. 11, 2020

(87) PCT Pub. No.: WO2019/154967
PCT Pub. Date: Aug. 15, 2019

(65) Prior Publication Data
US 2021/0035549 A1 Feb. 4, 2021

(30) Foreign Application Priority Data

Feb. 12, 2018 (FR) ..................... 1851155

(51) Int. Cl.
*G10K 15/04* (2006.01)
(52) U.S. Cl.
CPC ................. *G10K 15/046* (2013.01)

(58) Field of Classification Search
CPC .................................. G10K 15/046
See application file for complete search history.

(56) References Cited

U.S. PATENT DOCUMENTS 7,624,640 B2   12/2009  Maris et al.
10,191,015 B2 * 1/2019  Watanabe .......... G01N 29/2418
(Continued)

FOREIGN PATENT DOCUMENTS

WO  WO 2006/132862 A2  12/2006
WO  2008/097527 A1  8/2008

OTHER PUBLICATIONS

Grudinin, Ivan S. et al., *Phonon Laser Action in a Tunable Two-Level System*, The American Physical Society, Physical Review Letters, vol. 104, No. 8 (dated Feb. 23, 2010), 4 pages.

(Continued)

*Primary Examiner* — Forrest M Phillips
(74) *Attorney, Agent, or Firm* — BakerHostetler

(57) ABSTRACT

A phonon parametric oscillator is provided. The phonon parametric oscillator comprises a laser for periodically emitting brief optical pulses (IL), an assembly for generating acoustic pulses (IA) and a medium for coupling the acoustic pulses to an object (O), the assembly for generating acoustic pulses comprising an entrance face, an exit face, a conversion medium for converting the brief optical pulses into acoustic pulses and a propagation medium for propagating said acoustic pulses, the entrance and exit faces being reflective to the acoustic pulses, the propagation medium having a defined thickness, the exit face making contact with the coupling medium. In the phonon parametric oscillator according to the invention, the round-trip time of an acoustic pulse due to reflection from the entrance and exit faces, is (Continued)

equal to the emission period (τ) of the laser, so that the reflected acoustic pulse is in phase with the following acoustic pulse.

15 Claims, 4 Drawing Sheets

(56) References Cited

U.S. PATENT DOCUMENTS

| | | | | |
|---|---|---|---|---|
| 2003/0150272 | A1* | 8/2003 | Janik | G01N 29/348 |
| | | | | 73/643 |
| 2006/0272418 | A1* | 12/2006 | Maris | G01S 15/8965 |
| | | | | 430/5 |
| 2012/0263196 | A1* | 10/2012 | Pask | H01S 3/105 |
| | | | | 372/3 |
| 2020/0240957 | A1* | 7/2020 | Hwang | G01N 29/2418 |

OTHER PUBLICATIONS

Mahboob, I. et al., *Phonon-cavity electromechanics*, Nature Physics, vol. 8, No. 5 (dated Apr. 1, 2012), pp. 387-393.
Makler, Sergio S. et al., *A source of terahertz coherent phonons*, Journal of Physics: Condensed Matter, vol. 10, No. 26 (dated Jul. 6, 1998), 18 pages.
Navarro-Urrios, D. et al., *A self-stabilized coherent phonon source driven by optical forces*, Scientific Reports, vol. 5, No. 15733, (dated Oct. 27, 2015), 7 pages.
International Search Report and Written Opinion for International Application No. PCT/EP2019/053094 dated Apr. 8, 2019, 14 pages.

* cited by examiner

PHONON PARAMETRIC OSCILLATOR

CROSS-REFERENCE TO RELATED APPLICATIONS

The present application is a national phase entry of PCT/EP2019/053094, filed on Feb. 8, 2019, which claims the benefit of priority of French Patent Application No. 1851155, filed Feb. 12, 2018, the entire contents of which are hereby incorporated by reference in their entirety for all purposes.

TECHNICAL FIELD

The field of the invention is that of emitters of acoustic pulses at very high frequencies, typically several tens of gigahertz, or even several hundred gigahertz. For these applications, the duration of the acoustic pulses is typically of the order of one picosecond. Such very high frequency acoustic sources have various applications. Mention may especially be made of the metrology of thin layers, acoustic microscopy or even the production of phononic sources or devices, in which phonons play the same role as electrons in electronics.

BACKGROUND

The range of achieved frequencies is beyond what it is technically possible to achieve with the conventional techniques of physical acoustics such as, for example, piezoelectric transduction. There are however various techniques for producing these pulses.

By way of first example, the publication entitled "A self-stabilized coherent phonon source driven by optical forces", D. Navarro-Urrios et al., Scientific Reports 5, no 15733, 2015 describes the production of a "phonon laser" that employs an opto-mechanical crystal combining acoustic and photonic optical properties. However, the range of achieved frequencies remains limited to 100 megahertz.

By way of second example, the publication entitled "A source of terahertz coherent phonons", Sergio S. Makler et al., Journal of Physics: Condensed Matter, vol 10, no 26 describes the ability to produce an acoustic laser or "SASER", acronym of "Sound Amplification by Stimulated Emission of Radiation" with a technology similar to that of quantum cascade lasers: the emission of a photon on each transition in the structure is replaced by the emission of an optical phonon that then subdivides into an optical phonon and an acoustic phonon.

Lastly, the technique commonly used to reach these frequencies and these pulse durations is obtained using the technique referred to as "picosecond acoustics". Acoustic pulses are generated by laser pulses focused onto an absorbent material or layer of absorbent material. These pulses generate abrupt heating of the material, which causes expansion thereof and the generation of an acoustic pulse of short duration. In this field, the U.S. Pat. No. 7,624,640 of Maris et al. entitled "Opto-acoustic methods and apparatus for performing high resolution acoustic imaging and other sample probing and modification operations" may be mentioned by way of example. This patent describes the production of a very high frequency acoustic microscope.

SUMMARY

As has been said, one of the major constraints on this type of emitters is the need to obtain the briefest possible pulses. A second constraint is the need to obtain acoustic pulses having a certain energy without too greatly increasing the energy of the laser pulses, so that the emitter preserves a reasonable bulk. The parametric oscillator according to the invention allows acoustic pulses that are both brief and intense to be obtained without increasing the laser power required. It consists in creating an acoustic cavity the acoustic parameters of which are matched to the duration of the laser pulses. More precisely, the subject of the invention is a phonon parametric oscillator comprising a laser for periodically emitting brief optical pulses, an assembly for generating acoustic pulses and a medium for coupling the acoustic pulses to an object, the assembly for generating acoustic pulses comprising an entrance face, an exit face, a conversion medium for converting the brief optical pulses into acoustic pulses and a propagation medium for propagating said acoustic pulses, the entrance and exit faces being reflective to the acoustic pulses, the propagation medium having a defined thickness, the exit face making contact with the coupling medium, characterized in that the round-trip time of an acoustic pulse due to reflection from the entrance and exit faces, is equal to the emission period of the laser, so that the reflected acoustic pulse is in phase with the following acoustic pulse.

Advantageously, the assembly for generating acoustic pulses comprises, in this order, the entrance face, the conversion medium, the propagation medium and the exit face.

Advantageously, the assembly for generating acoustic pulses comprises, in this order, the entrance face, the propagation medium, the conversion medium and the exit face.

Advantageously, the conversion medium and the propagation medium are produced on one and the same substrate, the conversion medium being located on one of the faces of the propagation medium.

Advantageously, the conversion medium and the propagation medium are produced on one and the same substrate, the conversion medium being located inside the propagation medium.

Advantageously, the oscillator comprises means for adjusting the period of the emitting laser.

Advantageously, the oscillator comprises electrical or magnetic or thermal means for adjusting the propagation speed of the acoustic pulses through the propagation medium.

Advantageously, the thickness of the propagation medium varies along an axis perpendicular to the propagation direction of the acoustic pulses.

Advantageously, the acoustic reflection coefficients of the entrance face and of the exit face are higher than or equal to 90%.

Advantageously, the emitting laser is a so-called "femtosecond" laser that emits in a spectral range comprised between 680 nanometers and 1070 nanometers, its period being of 12.5 nanoseconds and the duration of the optical pulses being of 100 femtoseconds.

Advantageously, the emitting laser is a so-called "femtosecond" laser that emits in a spectral range comprised between 750 nanometers and 900 nanometers, its period being of 1 nanosecond and the duration of the optical pulses being of 100 femtoseconds.

Advantageously, the conversion medium is a medium that absorbs the optical pulses.

Advantageously, the conversion medium is a semiconductor medium or one with quantum dots.

Advantageously, the propagation medium is silicon or diamond or silicon carbide or sapphire.

Advantageously, the coupling medium is a liquid.

BRIEF DESCRIPTION OF THE SEVERAL VIEWS OF THE DRAWING(S)

The invention will be better understood and other advantages will become apparent on reading the following non-limiting description and by virtue of the appended figures, in which.

DETAILED DESCRIPTION

The phonon parametric oscillator according to the invention takes its inspiration from the operation of the optical parametric oscillators that are employed in another technical field.

Figure 1:
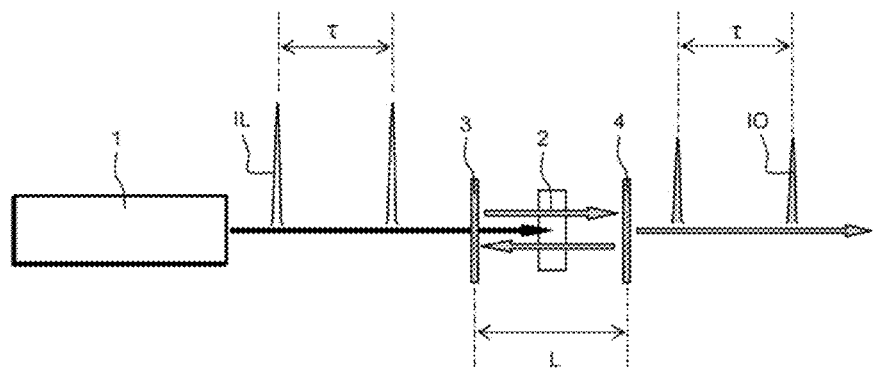
FIG. 1 shows an optical parametric oscillator according to the prior art.

An optical parametric oscillator is shown in FIG. 1. It comprises a laser 1 for emitting ultra-short and periodic optical pulses, a non-linear crystal 2 and a laser cavity composed of two mirrors 3 and 4. The laser pulses IL are shown in white in FIG. 1, they have a duration of about a few hundred femtoseconds; each pulse is separated from the following by a period u corresponding to the repetition frequency of the pulsed laser. These laser pulses are focused into the non-linear crystal, in which they are converted into two optical pulses 10 of lower energy. These optical pulses are shown in gray in FIG. 1. The mirrors of the cavity are designed to very efficaciously reflect one or both optical pulses thus generated.

The length L of the cavity is adjustable so as to be exactly matched to the repetition rate of the emitting laser. Thus, a first laser pulse is converted into two new optical pulses, which make a round-trip in the cavity during a time equal to the time t separating this first laser pulse from the following. When the following laser pulse reaches the non-linear crystal, the optical pulses do also and the new conversion is added to the first. Thus, a regime is established in which each laser pulse is converted to one or two optical pulses of lower energy. The duration of the pulse is conserved so that the optical parametric oscillator is equivalent to a femtosecond source emitting in a new wavelength range.

The phonon parametric oscillator according to the invention operates according to similar principles but applied to the field of phononics. Generally, it comprises a laser for periodically emitting brief optical pulses, an assembly for generating acoustic pulses and a medium for coupling the acoustic pulses to an object, the assembly for generating acoustic pulses comprising an entrance face, an exit face, a conversion medium for converting the brief optical pulses into acoustic pulses and a propagation medium for propagating said acoustic pulses, the entrance and exit faces being reflective to the acoustic pulses, the propagation medium having a defined thickness, the exit face making contact with the coupling medium. The round-trip time of an acoustic pulse due to reflection from the entrance and exit faces, is equal to the emission period of the laser, so that the reflected acoustic pulse is in phase with the following acoustic pulse.

Figure 2:
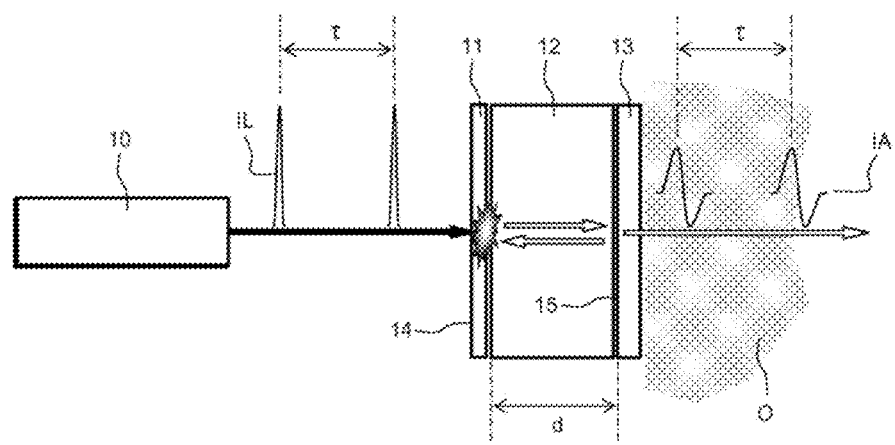
FIG. 2 shows a general overview of a phonon parametric oscillator according to the invention.

FIG. 2 shows a first example of an embodiment of an oscillator according to the invention. It comprises, in this order, a laser 10 for periodically emitting brief optical pulses IL, which are represented by peaks in FIG. 2, a conversion medium 11 for converting said optical pulses IL into acoustic pulses IA, which are represented by sinusoids in FIG. 2, a propagation medium 12 for propagating said acoustic pulses and a coupling medium 13 for coupling said acoustic pulses to an object O to be studied. The laser pulses IL have a duration of about a few tens of femtoseconds to a few hundred femtoseconds; each pulse is separated from the following by a period $\tau$ corresponding to the repetition frequency of the pulsed laser.

By way of first example, the emitting laser is a so-called "femtosecond" laser that emits in a spectral range comprised between 680 nanometers and 1070 nanometers, its period being 12.5 nanoseconds and the duration of the optical pulses being of 100 femtoseconds. By way of second example, the emitting laser is a femtosecond laser that emits in a spectral range comprised between 750 nanometers and 900 nanometers, its period being 1 nanosecond and the duration of the optical pulses being of 100 femtoseconds The laser is focused inside the conversion medium. Typically, the diameter of the focal spot is about 10 m or a few tens of m. By way of example, the power of the pump laser is about 100 mW.

The conversion medium may act via optical absorption then thermal expansion. A metal layer may be used to this end. This medium may also be a semiconductor structure with quantum wells or quantum dots. In this example, the entrance face 14 corresponds to the entrance face of the conversion medium and is perfectly reflective to acoustic pulses.

The propagation medium has a thickness d and an exit face 15. The exit face makes contact with the coupling medium, the exit face being reflective to the acoustic pulses.

There is a simple way of obtaining a perfectly reflective entrance or exit face. It is enough for this face to correspond to a material/air or air/material interface.

By way of non-limiting examples, the propagation medium is silicon or diamond or silicon carbide or sapphire.

Figure 3:
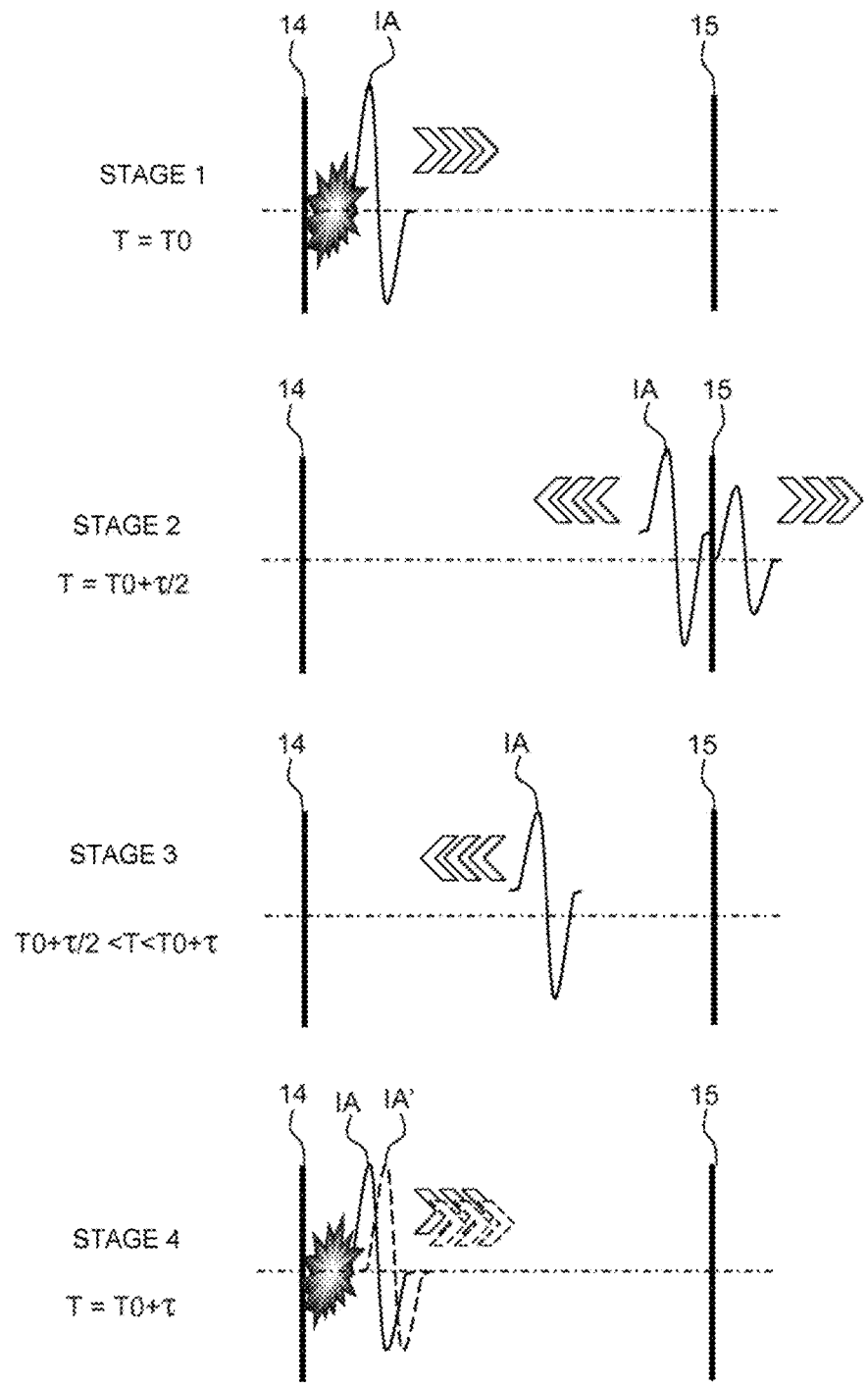
FIG. 3 shows the operating principle of the acoustic cavity according to the invention.

The operation of this phonon parametric oscillator is shown in FIG. 3, which illustrates the important steps of the operation thereof. At a time T0, a laser pulse is converted into an acoustic pulse IA by the conversion medium. Once the acoustic pulse has been generated, it propagates through the propagation medium as shown in step 2 of FIG. 3. At a time T equal to T0+$\tau$/2, the pulse is partially reflected back on itself from the exit face 15, passes a second time through the propagation medium and reaches the conversion medium at the time T0+$\tau$. The transmitted portion of the acoustic pulse passes through the coupling medium and reaches the object. This coupling medium is, for example, a liquid.

The round-trip time through the propagation medium, due to reflection, from the exit face, of this acoustic pulse, is equal to the emission period of the laser, and hence the reflected acoustic pulse is in phase with the acoustic pulse IA' generated next as shown in step 4 of FIG. 3. This second acoustic pulse is drawn with a dashed line in FIG. 3. Since the entrance face 14 is perfectly reflective, the first pulse passes back through the propagation medium and once more a portion of this pulse is transmitted.

It will also be clear that, after one round-trip, the pulses must be oriented in the same direction for their amplitudes to add. After a reflection from a face, there may be a change in sign of the amplitude of the pulse. It is compensated for by the same change in sign on reflection from the other face.

Thus, the reflection from the surface 15 may have a negative reflection coefficient. This condition is met in most applications, in particular when the coupling is achieved via a liquid that possesses an impedance lower than that of a solid. The important thing is for the phase of the acoustic wave to be identical to the initial one after two reflections.

Thus, the intensity of the acoustic pulses transmitted to the coupling medium corresponds to the sum of the intensities of the in-phase pulses having made at least one round-trip through the propagation medium.

The gain generated by the oscillator according to the invention is high with respect to an oscillator in which the acoustic pulses are emitted directly. Its calculation is the following. The amplitude of the reflection coefficient of the exit face of the propagation region is called r, the length of the propagation medium is called d and the acoustic attenuation coefficient per unit length in the propagation medium is called $\alpha$—this coefficient $\alpha$ increases with the square of the acoustic frequency. As has been seen, the reflection coefficient r may be negative depending on the type of reflection.

This coefficient decreases with temperature and it is preferable to work at low temperature, i.e. at temperatures comprised between a few kelvin a few tens of kelvin.

The attenuation A of an acoustic pulse having made a round trip is therefore equal to:

$$A = r \exp(-2\alpha d)$$

The gain G generated by the oscillator is equal to the sum of the attenuations of the acoustic pulses having made n round-trips, n being an integer number; it is possible to write:

$$G = 1 + A + A^2 + A^3 + A^4 + \ldots$$

For a high number of terms, this gain is conventionally equal to:

$$G = 1/(1-A)$$

This gain reaches high values if the reflection coefficient of the exit face is high and if the acoustic attenuation coefficient per unit length in the propagation medium is low or if the thickness passed through is low.

Since the coefficient $\alpha$ increases with the square of the acoustic frequency, it is more difficult to obtain high gains at low frequency than at high frequency.

By way of example, if the attenuation A is higher than 90%, the gain G exceeds 10.

The two tables below give orders of magnitude for the gains obtained for four types of materials, two repetition frequencies, two different acoustic frequencies, different thicknesses and a reflection coefficient of 99%.

TABLE I

| Repetition frequency: 80 MHz |
| Acoustic frequency: 10 GHz |

| Material | Thickness in µm | Gain |
|---|---|---|
| Silicon | 52.5 | 66 |
| Diamond | 112.5 | 82 |
| Silicon carbide | 78.1 | 76 |
| Sapphire | 75 | 87 |

TABLE II

| Repetition frequency: 1 GHz |
| Acoustic frequency: 100 GHz |

| Material | Thickness in µm | Gain |
|---|---|---|
| Silicon | 4.2 | 20 |
| Diamond | 9 | 36 |
| Silicon carbide | 6.1 | 35 |
| Sapphire | 6 | 30 |

Figure 4:
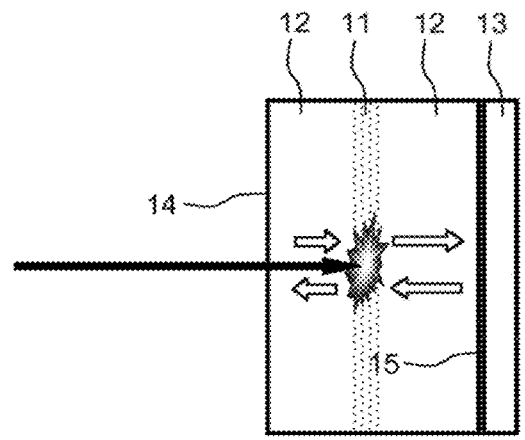
FIG. 4 shows a first variant embodiment of a phonon parametric oscillator according to the invention.

FIG. 4 shows a second example of an embodiment of an oscillator according to the invention. In this embodiment, the conversion medium 11 and the propagation medium 12 are produced on one and the same substrate, which is doped differently depending on the function performed. In this configuration, as may be seen in FIG. 4, the conversion medium 11 is not necessarily located in the vicinity of one of the faces of the propagation medium, but may be located inside, in the vicinity of the center, for example. Thus, the laser pulses pass through all or some of the propagation medium before encountering the conversion medium. It is enough for the propagation medium to be transparent to the optical pulses, this generally being the case. There is no parasitic interaction between the optical pulses and the acoustic pulses inside the propagation medium.

Figure 5:
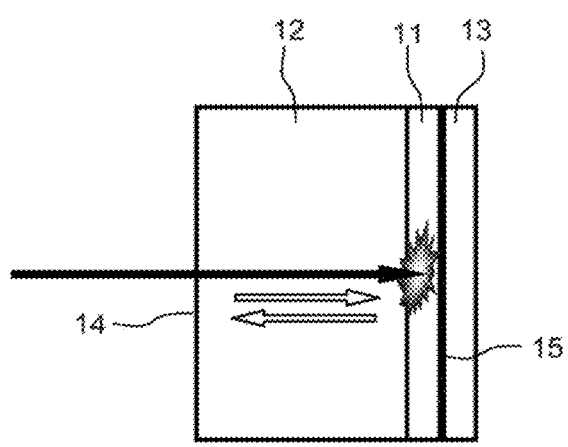
FIG. 5 shows a second variant embodiment of a phonon parametric oscillator according to the invention.

FIG. 5 shows a third example of an embodiment of an oscillator according to the invention. In this embodiment, the oscillator comprises, in this order, a laser 10 for periodically emitting optical pulses, a propagation medium 12, a conversion medium 11 for converting the optical pulses into acoustic pulses and, lastly, the coupling medium 13. Once again, it is enough for the propagation medium to be transparent to the optical pulses, this generally being the case.

To obtain a high gain, it is essential for all of the acoustic intensities that contributed to this gain and that result from the multiple round trips to be perfectly in phase. The acoustic thickness of the cavity must therefore be perfectly matched to the repetition frequency of the emitting laser. Generally, it is estimated that this match must be to within 1% and, if possible, to within 0.1%. It is possible, by ensuring adequate constructional tolerances, to achieve this match without adjustments. However, the thicknesses of the propagation medium being generally small, it may prove to be advantageous for the oscillator to comprise intrinsic adjusting means.

A plurality of technical solutions are possible. The oscillator may comprise means for adjusting the period of the emitting laser, or it is possible to achieve this end by slightly modifying the emission wavelength.

The oscillator may comprise electrical or magnetic or thermal means for adjusting the propagation velocity of the acoustic pulses through the propagation medium, these depending on the type of medium used. It is known that the speed of sound is especially sensitive to temperature.

Figure 6:
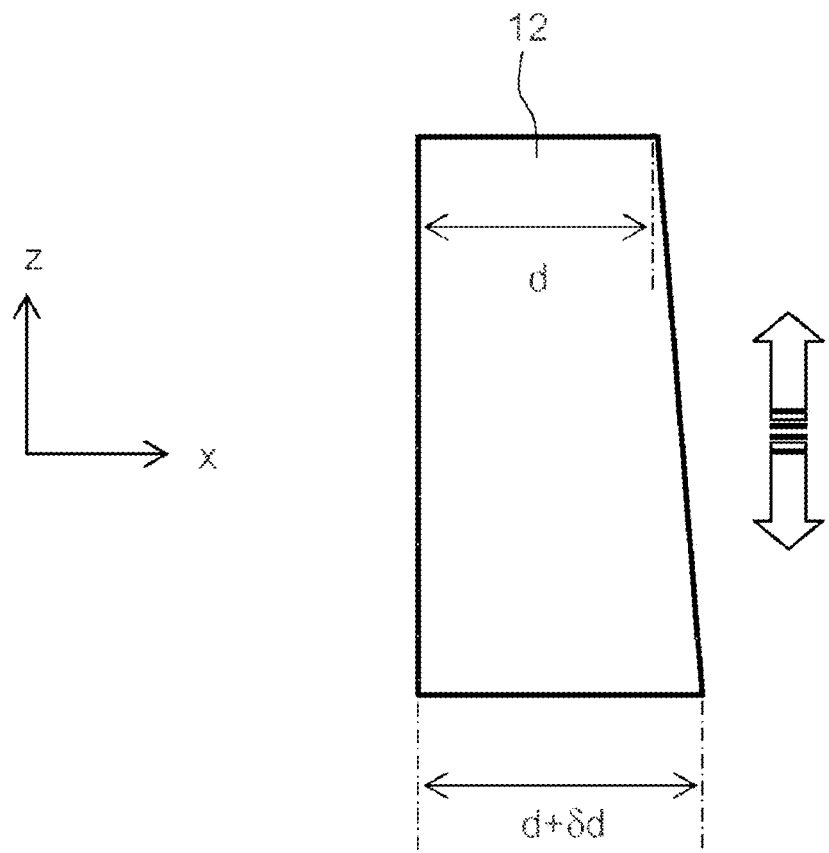
FIG. 6 shows a variant embodiment of the propagation medium of the parametric oscillator.

It is also possible to employ a propagation medium the thickness of which varies along an axis perpendicular to the propagation direction of the acoustic pulses as shown in FIG. 6, in which the thickness of the propagation medium 12 varies between d and d+$\delta$d along the axis z perpendicular to the propagation axis x of the acoustic waves. It is then enough to adjust the round-trip time to move the propagation medium along this axis z until the match between the period of the optical pulses and the round-trip time of the acoustic pulses is obtained. This movement is symbolized by a white double-headed arrow in FIG. 6.

The invention claimed is:

1. A phonon parametric oscillator comprising a laser for periodically emitting brief optical pulses (IL), an assembly for generating acoustic pulses (IA) and a medium for coupling the acoustic pulses to an object (O), the assembly for generating acoustic pulses comprising an entrance face, an exit face, a conversion medium for converting the brief optical pulses into acoustic pulses and a propagation medium for propagating said acoustic pulses, the entrance and exit faces being reflective to the acoustic pulses, the propagation medium having a defined thickness, the exit face making contact with the coupling medium, wherein the round-trip time of an acoustic pulse due to reflection from the entrance and exit faces is equal to the emission period ($\tau$) of the laser, so that the reflected acoustic pulse is in phase with the following acoustic pulse.

2. The phonon parametric oscillator as claimed in claim 1, wherein the assembly for generating acoustic pulses comprises, in this order, the entrance face, the conversion medium, the propagation medium and the exit face.

3. The phonon parametric oscillator as claimed in claim 1, wherein the assembly for generating acoustic pulses comprises, in this order, the entrance face, the propagation medium, the conversion medium and the exit face.

4. The phonon parametric oscillator as claimed in claim 1, wherein the conversion medium and the propagation medium are produced on one and the same substrate, the conversion medium being located on one of the faces of the propagation medium.

5. The phonon parametric oscillator as claimed in claim 1, wherein the conversion medium and the propagation medium are produced on one and the same substrate, the conversion medium being located inside the propagation medium.

6. The phonon parametric oscillator as claimed in claim 1, wherein the oscillator comprises means for adjusting the period of the emitting laser.

7. The phonon parametric oscillator as claimed in claim 1, wherein the oscillator comprises electrical or magnetic or thermal means for adjusting the propagation speed of the acoustic pulses through the propagation medium.

8. The phonon parametric oscillator as claimed in claim 1, wherein the thickness of the propagation medium varies along an axis perpendicular to the propagation direction of the acoustic pulses.

9. The phonon parametric oscillator as claimed in claim 1, wherein the acoustic reflection coefficients of the entrance face and of the exit face are higher than or equal to 90%.

10. The phonon parametric oscillator as claimed in claim 1, wherein the emitting laser is a so-called "femtosecond" laser that emits in a spectral range comprised between 680 nanometers and 1070 nanometers, its period being of 12.5 nanoseconds and the duration of the optical pulses being of 100 femtoseconds.

11. The phonon parametric oscillator as claimed in claim 1, wherein the emitting laser is a so-called "femtosecond" laser that emits in a spectral range comprised between 750 nanometers and 900 nanometers, its period being of 1 nanosecond and the duration of the optical pulses being of 100 femtoseconds.

12. The phonon parametric oscillator as claimed in claim 1, wherein the conversion medium is a medium that absorbs the optical pulses.

13. The phonon parametric oscillator as claimed in claim 1, wherein the conversion medium is a semiconductor medium or one with quantum dots.

14. The phonon parametric oscillator as claimed in claim 1, wherein the propagation medium is silicon or diamond or silicon carbide or sapphire.

15. The phonon parametric oscillator as claimed claim 1, wherein the coupling medium is a liquid.

* * * * *